Aug. 27, 1946.   G. E. KING   2,406,426
CONTROL SYSTEM
Filed Oct. 17, 1944
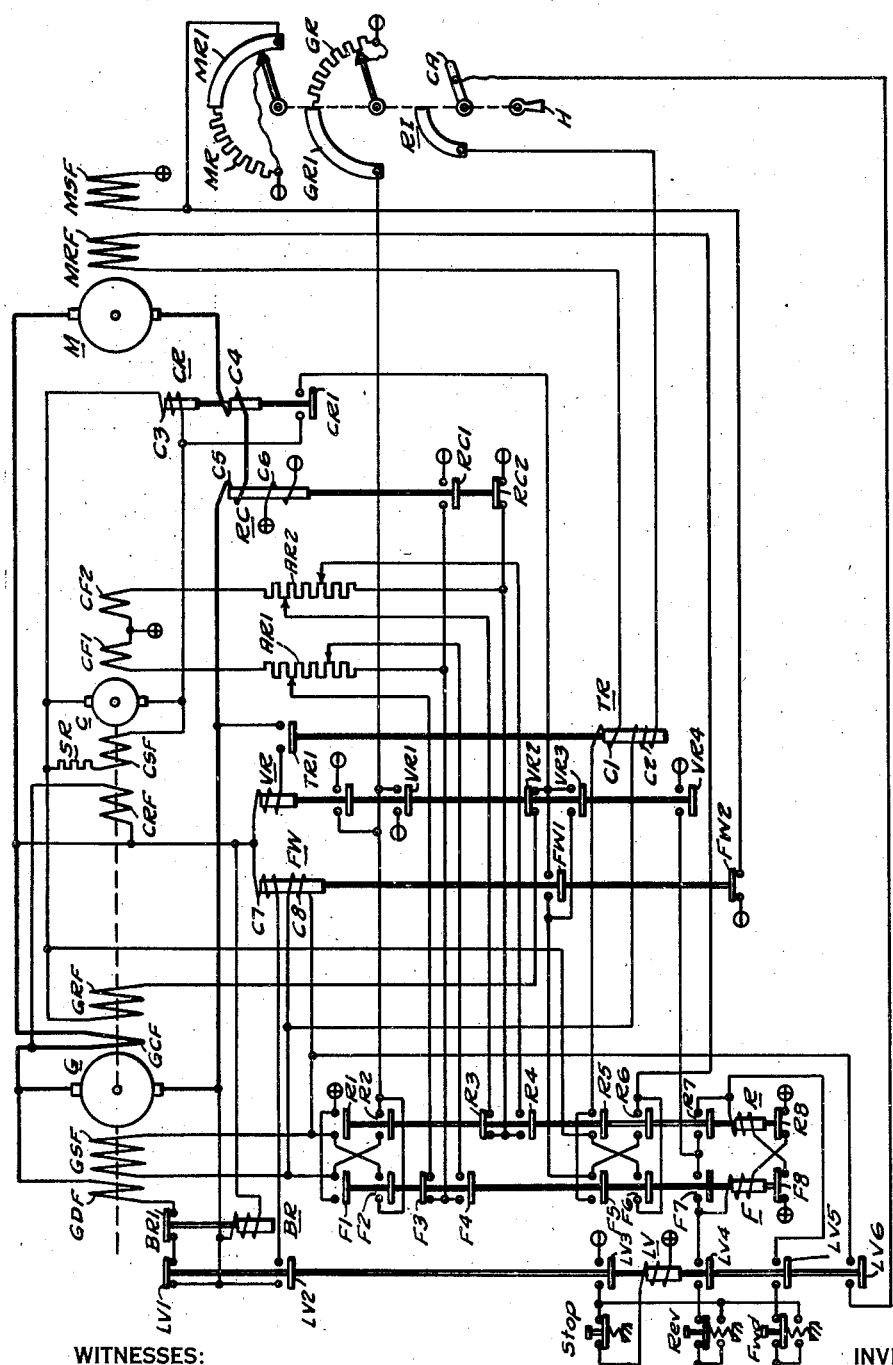
WITNESSES:
E. A. McCloskey
C. F. Oberheim
INVENTOR
George E. King.
BY
Paul E. Friedemann
ATTORNEY Patented Aug. 27, 1946

2,406,426

UNITED STATES PATENT OFFICE 2,406,426

CONTROL SYSTEM

George E. King, Swissvale, Pa., assignor to Westinghouse Electric Corporation, East Pittsburgh, Pa., a corporation of Pennsylvania Application October 17, 1944, Serial No. 559,067

6 Claims. (Cl. 172—179)

The present invention relates to variable voltage control systems, and more particularly to a variable voltage drive for operating or automatically controlling the operation of motors connected to various types of mechanical loads. In certain of its aspects, this invention is related to a copending application of George E. King and William H. Formhals, Serial No. 559,068, filed on the same date as this application and entitled Control system (W. E. Case 23,453), to a copending application of George E. King, Serial No. 559,066, filed on the same date as this application and entitled Control systems (W. E. Case 23,417), and to another copending application of George E. King, Serial No. 559,065, also filed on the same date as this application and entitled Control systems (W. E. Case 23,232).

This invention provides certain improvements in variable voltage control systems in which rotating regulators are employed to regulate certain electrical quantities of the system, and the invention as hereinafter described and as illustrated in the drawing is specifically directed to a control for a direct-current motor embodying provisions for limiting the motor armature current whether the motor is operating normally as a motor or during regenerative periods when the motor is being overhauled by its mechanical load and driven as a generator.

In the copending applications hereinbefore referred to, automatic speed regulation of the motor is provided in conjunction with current limiting protection. In this application, however, automatic speed regulation of the motor is not shown in the interest of simplicity. It will be apparent, however, to one skilled in the art that automatic speed regulation in the variable voltage drive hereinafter disclosed may be obtained in a manner similar to that disclosed in the said copending applications. It will also be apparent to one skilled in the art that this invention is not necessarily limited to motor control, since automatic regulation of the maximum permissible currents supplied to an electrical load of substantially any type susceptible of regulation may be had.

A principal object of this invention is to provide a variable voltage drive for a motor in which the motor armature currents are automatically limited within permissible or desired values.

Another and more specific object of this invention is to provide a variable voltage drive in which accurate adjustment of the maximum accelerating current between certain limits is obtained.

Yet another specific object of this invention is to provide a variable voltage drive in which accurate adjustment of the maximum braking currents between certain limits is obtained.

A further specific object of this invention is to provide a variable voltage drive including means for independently adjusting both the accelerating and the braking current.

Other objects and advantages will become more apparent upon a study of the following disclosure when considered in conjunction with the accompanying drawing, in which:

The single figure thereof illustrates a variable voltage drive for a motor embodying the principles of this invention.

Referring now to the drawing, the variable voltage drive comprises a main motor M which is provided with a separately excited field winding MSF and a regulating field winding MRF. The motor separately excited field winding MSF provides the main excitation for the motor while the motor regulating field winding MRF provides the necessary corrective excitation for the motor under certain operating conditions to maintain the motor armature currents within permissible limits.

A main generator G is utilized to energize the motor M. Its armature winding is connected in series with the motor armature winding. The main generator G is provided with a separately excited field winding GSF which provides the main excitation for the generator. It also has a regulating field winding GRF which under certain operating conditions of the system provides the corrective excitation for the generator necessary to maintain the motor armature currents within permissible values. The field system of this generator also includes a commutating field winding GCF and a differential field GDF which is utilized near the end of the braking periods when the generator voltage has decreased to a certain minimum value to neutralize the residual voltage of the generator.

A control generator C is utilized to provide the corrective currents necessary to maintain the motor armature currents within permissible values. This control generator is provided with calibrating field windings, designated CF1 and CF2. These windings are differentially arranged, that is, they produce opposite fluxes and are separately employed to provide the desired excitation for the control generator C during accelerating and braking periods of the motor either in the forward or reverse directions of operation thereof.

A regulating field winding for the control generator designated CRF is excited by the drop across the main generator commutating field GCF. Thus the excitation of the regulating field CRF depends upon the current circulating in the motor generator armature circuit.

The control generator C is of the self-energizing type and is provided for this purpose with a shunt connected armature current energized field winding CSF which is connected in series with a resistor SR across the armature terminals of the control generator. This resistor is so adjusted or selected in its electrical resistance value that the resistance line of this shunt field circuit is tangent to the initial straight line portion of the no-load saturation curve of the control generator. It then becomes the function of either of the calibrating field windings depending upon which is energized, operating in conjunction with the regulating field winding to select the proper operating point of this generator along the tangent curves. With this arrangement and depending upon the net excitation of the control generator, this generator may have an electrical output or rather a voltage output equal to the ordinate of any of the points of tangency of the curve of the resistance line and the initial straight line portion of the no-load saturation curves. The circuit is so arranged, that is, the field windings of the machine are so arranged when connected, that the ampere turns from the regulating field winding are always opposed to the ampere turns from the connected calibrating field winding.

Suitable magnetic controllers are provided in the system which respond to motor armature currents to connect the control generator in the system such that the control generator does not effect the operation of the generator or motor until the ampere turns of the regulating field winding CRF are greater than the ampere turns of the connected calibrating field winding. The ampere turns of the calibrating field windings can be preset by proper adjustment of the taps provided on the adjustable calibrating resistors AR1 and AR2, respectively, connected in series with the calibrating field windings CF1 and CF2. With this arrangement it is possible to obtain independent values of accelerating and braking current.

The CR or current relay is used to connect the control generator armature to the generator and motor regulating fields at the proper time. If it is desired to limit the accelerating current, for example, to 150% of full-load current, then the CR relay should pick up near this value. The CR relay has a series coil C4 connected in series relation with the motor and generator armatures and a shunt coil C3 excited according to the electrical output of the control generator. The ampere turns of these coils are in opposition when the control generator voltage output is due to the ampere turns of either of the calibrating field windings CF1 or CF2 being greater than those of the regulating field winding and the ampere turns of the two coils of the CR relay are cumulative when the voltage output of the control generator C is due to the ampere turns of the regulating field winding being greater than those of either of the calibrating field windings. Under this last mentioned condition, the CR relay picks up and establishes certain circuits for energizing the generator regulating field or the motor regulating field or under certain operating conditions both of these fields.

The RC or reverse current relay is used to select the correct calibrating field of the control generator. In its deenergized position circuits are established for energizing the calibrating field winding CF2. In its energized position, the calibrating field winding CF1 may be energized. The series coil C5 of this relay is connected in series in the motor generator armature circuit. The shunt coil C6 is connected across a suitable source of potential which may, for example, be an exciter driven at a constant speed along with the main generator and the control generator C but which is not shown in the interest of simplicity. The ampere turns of the coil C5 and C6 add when the motor is accelerating and subtract during braking periods of the motor when the motor is operating in the forward direction. They subtract during acceleration and add during braking when the motor is operated in a reverse direction. This relay may be adjusted to pick up with 10% of full-load current in the series coil C5 aiding the shunt coil and to drop out with 10% of full-load current in the series coil subtracting from the shunt coil.

The VR or voltage relay is used to select the generator or motor regulating field and to maintain full generator voltage when braking due to strengthening of the motor shunt field, the VR relay has its single or shunt coil connected across the generator armature in series with the contact TR1 of the timing relay TR. It is adjusted to pick up near maximum generator voltage. It drops out due to the TR relay contact TR1 opening and deenergizing its coil.

The TR or timing relay controls the operation of the voltage relay VR. It is an inductive time element relay with an inherent short time element when both coils are deenergized. The main or pickup coil C2 is connected in series with the LV6 contact and the rheostat interlock RI across a suitable source of energizing potential. The rheostat interlock closes when all the generator field portion of the resistor GR has been shorted and remains closed during the motor field weakening portion of the rheostat. This motor field weakening is accomplished over the motor rheostat section MR. The holding coil C1 is connected in series with the motor regulating field so that it will hold the TR relay closed as long as it it is energized by the control generator during the braking cycle.

The FW or motor separately excited field weakening relay is used to insert the motor rheostat resistor MR and its conducting segment MR1 in series with the motor shunt field. Its shunt coil C7 is connected across the generator armature in series with the LV2 contact. The other is connected across the positive and negative terminals indicated which again may be exciter buses, in series with either the F1 and F2 contacts or the R1 and R2 contacts depending upon which of the F and R relays are energized and the generator rheostat GR or the contacts VR1 if the VR relay is energized. This relay FW is adjusted to pick up at a different generator voltage which may, for example, be somewhat less than that required to pick up the VR relay. Energization of both coils is required for pickup. The FW relay drops out when the coil C3 thereof is deenergized or the generator voltage decreases sufficiently.

The LV or low voltage relay is used to energize the generator shunt field GSF in conjunction with either of the forward or reversing contactors F and R depending upon whether the forward or reversing push button Fwd or Rev is depressed. This relay in a sense effects the operation of the timing relay TR and the field weakening relay FW. Energization of this relay is initiated by depressing either the forward or reverse push button.

The motor and generator field rheostats, designated respectively, MR and GR, together with the rheostat interlock RI are controlled from a single handle or handwheel H. The arrangement of the motor and generator rheostats is such that it is first necessary to strengthen the generator separately excited field GSF before weakening the motor separately excited field and vice versa. When the generator rheostat GR is completely shorted, the contact arm CA for the rheostat interlock engages the arcuate conducting segment and thus completes an energizing circuit for the coil C2 of the timing relay TR.

The forward and reversing contactors respectively designated F and R are required to reverse the main generator separately excited field GSF and the motor regulating field MRF. It is necessary to reverse the generator field GSF in order to reverse the direction of rotation of the motor armature. The current through the motor armature reverses and consequently is in the reverse direction through the control generator regulating field CRF. The polarity of the control generator armature is, therefore, reversed, and it is necessary to reverse the motor regulating field to keep its polarity correct with respect to the motor shunt field. Analogous considerations apply to the coil C8 of the FW relay.

Starting of the system for operation of the motor in the forward direction is accomplished by pressing the forward push button Fwd. This immediately closes the back contacts of the forward push button which in conjunction with the stop push button now closed completes an energizing circuit for the coil of the low-voltage relay LV. This relays picks up opening its contact members LV1 and disconnecting the generator differential field from its position across the generator armature terminals. The contact members LV2 close and complete an energizing circuit for the coil C7 of the field weakening relay FW across the main generator armature. The contact members LV3 close and in conjunction with the stop push bottom complete a holding circuit for the coil of the low-voltage relay LV. When the contact members LV4 close, an energizing circuit for the coil of the forward contactor F is completed. This circuit includes the reversing push button designated Rev, the contact members LV4, the coil of the forward contactor F and the back contact members R8 of the reversing contactor. The contact members LV5 also close. These contact members normally complete an energizing circuit for the coil of the reversing contactor. This circuit, however, at this stage of operation is not completed, since the forward push button is depressed and its back contact members which are essential to this energizing circuit are open. Closure of the contact members LV6 completes a partial energizing circuit for the coil C2 of the TR relay. This circuit, however, is open at the rheostat interlock RI, since the conducting segment and its contact arm CA are not in mechanical engagement.

Energization of the LV relay as previously described energizes the coil of the F relay for the assumed forward operating condition of the motor. This relay picks up and closes its contact members F1 and F2. This establishes an energizing circuit for the generator field winding GSF which may be traced from the point of positive potential adjacent the contacts R1 through the contact members F1, the field winding GSF, the contact members F2 through the generator rheostat GR to a point of negative potential. Thus a voltage is generated by the generator, and this voltage is applied across the motor armature terminals. Since the motor field winding MSF is connected from its point of positive potential through the back contacts FW2 of the field weakening relay to a point of negative potential, this field winding is excited at its maximum voltage. The motor thus accelerates under the influence of a fully excited field winding. The contact members F1 and F2 also complete an energizing circuit for the coil C8 of the field weakening relay FW. As shown, this field is connected in parallel with the generator field GSF. Hence, its energization will be understood without further tracing of the circuit through the F1 and F2 contacts. The contact members F3 open while the contact members F4 close. Closure of the contact members F4 inserts a large portion of the adjustable calibrating rheostat AR1 in series with the control generator calibrating field CF1. This field winding is arranged to produce a magnetic field linking the rotor of the control generator which is in opposition to that produced by the regulating field CRF for forward operation of the motor. Since the excitation of the calibrating field CF1 upon closure of the contact members F4 is lower than that obtained when the contact members F3 are closed by reason of the setting of the rheostat taps, the currents in the motor armature circuit are limited at a lower value during acceleration of the motor. Such a feature, for example, may be desirable if the motor is driving a high inertia mechanical load through a suitable friction drive. Under such a condition, it is desirable to accelerate this high inertia mechanical load without causing slipping of the friction drive. Hence, it is desirable to limit the motor armature currents more as a means to prevent excessive accelerating torque of the motor than to limit the motor armature currents to prevent damage to the electrical circuits. Both the accelerating and braking resistors, of course, may be adjusted to permit high armature currents during initial periods of acceleration and braking if desired. The contact members F5 and F6 when closed function to partially complete energizing circuits for the motor regulating field winding MRF across the control generator. These contact members determine the polarity of the motor regulating field for forward operation of the motor to provide the cumulative relationship of the motor fields. The contact members F7 in conjunction with the contact members VR4 when closed, establish a holding circuit for the coil of the F contactor which is independent of the reversing push button. This eliminates any possibility of reversing the motor at high generator voltages. It is first necessary to depress the stop button and deenergize the LV relay thus decelerating the motor under the influence of its field windings. This provides a decelerating cycle substantially the reverse of the accelerating cycle. This circuit, however, is not established until the generator voltage has approached its maximum values since the VR relay does not pick up until such a voltage obtains. Opening of the contact members F8 prevents the coil of the reversing contactor R from being energized when the forward push button is released and its back contact members closed.

Since the motor is now operating at its full field speed, its speed of rotation is fairly low. If it is desired to increase the speed of the motor, the handle or handwheel H may be rotated in a counterclockwise direction. This will shunt increasingly larger portions of the generator rheostat GR to increase the excitation of the generator field GSF and hence increase the electrical output of the main generator. Thus, the motor will tend to increase its speed. Eventually when all of the generator field rheostat is shunted, the contact arm CA closes the rheostat interlock and completes an energizing circuit for the pick-up coil C2 of the timing relay TR. This timing relay is thus energized and closes its contact members TR1, thus connecting the coil of the voltage relay VR across the generator armature circuit. The voltage relay, however, may not at this time pickup, since the generator voltage is more than likely not up to or closely approaching its maximum value. As the generator voltage builds up, it causes increasingly larger currents to flow through the motor armature, the control generator regulating field CRF and series coils C5 and C4, respectively, of the RC and CR relays. As soon as the current builds up, for example, to 10% of the motor full-load amperes, the reverse current relay RC picks up and energizes the calibrating field CF1 of the control generator. If the adjustable calibrating rheostat AR1 has been set to limit the accelerating current to say 150% of full-load current, then the current relay CR will close when the current approaches 150% of the full-load current since then the coil C3 then aids the coil C5. The relay CR upon closing connects the generator regulating field GRF to the control generator armature through the back contact VR2 and the front contact CR1, respectively, of the VR and CR relays, so that the ampere turns of the regulating field GRF are in opposition to the ampere turns of the shunt field GSF. This action of the control generator on the main generator regulating field prevents the generator voltage from changing too rapidly and so limits the accelerating current to 150% of the motor full-load current. As the motor speed approaches the full field speed, the FW relay picks up and closes its contact members FW1. This, through the medium of the contact members F5 and F6, connects the motor regulating field MRF across the control generator to be energized in the proper direction. When the back contact members FW2 open, these contact members which normally shunt the motor rheostat from the circuit now insert the motor rheostat in series with the motor shunt field.

The motor regulating field by reason of the contact members F5 and F6 is now connected to the control generator so that its ampere turns are cumulative with the ampere turns of the motor shunt field MSF. The action of the control generator on the motor regulating field now prevents the motor field flux from changing too rapidly and so limits the accelerating current to the preestablished value. It should be noted that now the control generator is connected to both the motor and generator regulating field. As the generator voltage approaches its maximum value, the voltage relay VR closes. This closes the contact members VR1, thereby shunting the generator rheostat from the circuit and exciting the generator separately excited field GSF at its maximum voltage. The contact members VR2 open and disconnect the generator regulating field from the control generator at the same time the contact members VR3 close and shunt the contact members FW1 which originally connected the motor regulating field across the control generator. Thus irrespective of the position of the contact members FW1 the motor regulating field is connected across the control generator. Under the present operating conditions, the motor regulating field now functions by itself to limit the motor armature currents. The contact members VR4, in conjunction with the contact members F7, form a holding circuit for the coil of the F contactor which is independent of the position of either of the forward or reversing push buttons. As the motor approaches the preestablished speed the accelerating armature current decreases and the current relay CR drops out due to the fact that the excitation of the control generator is now predominantly due to the calibrating field CF1. This disconnects the control generator from the motor regulating field. The motor armature current decreases to the value required to drive the load at the selected speed.

Should the operator desire to increase the speed of the motor and thus turn the rheostat further in the counterclockwise direction to insert more of the motor rheostat in series connection with the motor shunt field winding, the excitation of the motor separately excited field MSF will be weakened thereby causing the motor to accelerate. If under this accelerating condition the motor armature current increases sufficiently, the CR relay will again close and the control generator will act on the motor regulating field MRF to limit the current as hereinbefore described.

Assume the operator desires to decrease the motor speed and turns the rheostat to a low-speed setting at reduced generator voltage. The motor field is strengthened causing the motor to regenerate through the generator. The motor generator armature current reverses and the ampere turns of the coil C5 of the reverse current relay are now in opposition to those of the shunt coil C6. This causes the RC relay to drop out. The control generator calibrating field CF1 is thus deenergized at the contacts RC1 and the calibrating field CF2 is energized at the contacts RC2 functioning in conjunction with the closed back contacts R3. Most of the adjustable calibrating resistor AR2 is shunted by the contacts R3 to thus provide, for example, a higher permissible decelerating current than the previous accelerating current. When the braking current approaches the limit established by the setting of the adjustable calibrating rheostat AR2, the CR relay is sufficiently energized to close and connects the control generator to the motor regulating field. Since the voltage of the control generator is now reversed due to the reversal of motor armature current, current is circulated through the motor regulating field so that its ampere turns are in opposition to the ampere turns of the motor separately excited field, thereby preventing the motor field flux from building up too rapidly and so limits the braking current.

Since the rheostat was turned to a speed setting at reduced generator voltage, the rheostat interlock RI opened and deenergized the main or pickup coil on the relay TR. The short inherent time element of the TR relay prevents it from opening immediately, thus holding it closed until the control generator has sufficient time to generate a current in the reverse direction through the motor regulator field and the TR holding coil C1. The TR relay is now held closed by its holding coil. As the motor approaches its full field speed, the braking current decreases until the relay CR opens and deenergizes the motor regulating field and the TR relay holding coil. The TR relay drops out deenergizing the voltage relay. The voltage relay upon opening of its back contact members VR1 inserts a portion of the rheostat GR in series with the generator shunt field and at its contact members VR2 and VR3 transfers the control generator circuit from the motor regulating field to the generating regulating field. The motor regulating field, however, yet remains connected through the contacts FW1 if the relay FW is yet sufficiently energized by the main generator voltage. The braking current again increases due to the field flux of the generator decreasing. The current relay CR thus again picks up connecting the control generator to the generator regulating field. Since the control generator voltage is still reversed, current is circulated through the generator regulating field so that its ampere turns are now in the same direction as those of the separately excited field before it was deenergized. The action of the control generator is, therefore, to slow down the decay of flux in the generator and so limit the braking current. As the motor approaches the lower set speed, the braking current decreases. The CR relay drops out deenergizing the generator regulating field. The motor armature current reverses itself and settles down to the load current in a direction to operate the motor in the forward direction.

Now assume the motor is running at some weak field speed and the stop push button is pressed. The LV relay is deenergized and drops out deenergizing the main coil of the TR relay as well as the coil of the F contactor. As the generator voltage declines the FW relay drops out shorting out the portion of the rheostat in series with the motor field MSF at its back contacts FW2. The action is the same as though the rheostat were turned back as previously described. However, when the VR relay opens it now deenergizes the generator field GSF completely, since, substantially at this time the forward contactor F drops out opening its contact members F1 and F2 required to complete the energizing circuit for the generator field GSF. The motor now continues to brake down to near zero speed. Meanwhile the braking current and the generator voltage also decrease. The current relay CR drops out deenergizing the generator regulating field and then the braking relay BR drops out connecting the generator differential field across the generator armature, since the contacts LV1 are now closed, thus bringing the motor to rest and preventing it from creeping.

The reversing cycle of the system is substantially the same as that described in conjunction with forward operation, the reversing contactor R as previously mentioned reversing the connections of the main generator separately excited field GSF and the motor regulating field. The coil C7 of the field weakening relay FW is also reversed in polarity during reversing operation of the motor, since the motor armature voltage is reversed. Thus to make the action of the two coils cumulative, it is necessary to reverse the coil C8 to excite it in the same direction as the reversely excited coil C7.

The foregoing disclosure and the showings made in the drawing are merely illustrative of the principles of this invention and are not to be interpreted in a limiting sense. The only limitations are to be determined from the scope of the appended claims.

I claim as my invention:

1. In a variable voltage drive, the combination of, a motor, a main generator for supplying electrical current to the motor, a regulating field winding for the motor, a regulating field winding for the generator, an auxiliary generator, first electrically operated means responsive to the current of said motor and to the electrical output of said auxiliary generator, second electrically operated means responsive to the electrical output of said main generator, third electrically operated means responsive to the electrical output of said main generator, said first means when electrically operated cooperating with said second means when not electrically operated to electrically connect the regulating field winding of the main generator to the auxiliary generator, said third means when electrically operated cooperating with said first means when electrically operated to connect the regulating field winding for the motor to said auxiliary generator, and said second means when electrically operated disconnecting said main generator regulating field winding from said auxiliary generator and electrically connecting the motor regulating field winding to the auxiliary generator independently of said third means.

2. In a variable voltage drive, the combination of, a motor, a main generator for supplying electrical current to the motor, an auxiliary generator, and magnetic controller means responsive to the electrical quantities of said motor and said main generator for electrically connecting said auxiliary generator during operation of said motor from zero speed to running speed, to effect a control of first, said main generator, second to effect a control of both said main generator and said motor and third, to effect a control only of said motor.

3. In a variable voltage drive, the combination of, a motor, a main generator for supplying electrical energy to the motor, means for controlling the speed of said motor, an auxiliary generator, first means responsive to the motor current and the electrical output of the auxiliary generator, second means responsive to the main generator voltage, third means responsive to the main generator voltage, said first means and said second means cooperating under certain operating conditions of said motor to connect said auxiliary generator to said main generator, said first, second and third means cooperating under different operating conditions of said motor to connect said auxiliary generator to both said generator and said motor and said first and second means cooperating under other operating conditions of said motor to connect said auxiliary generator only to said motor.

4. In a variable voltage drive, the combination of, a motor, a main generator for supplying electrical energy to the motor, an auxiliary generator for effecting a control of the motor current, first means for selectively exciting the auxiliary generator with a predetermined electrical quantity for accelerating and braking of said motor, second means for exciting the auxiliary generator according to the motor current in opposition to either of the first mentioned selectively obtained excitations, and means operable when the excitation resulting from said second means predominates that of said first means for connecting the auxiliary generator to said main generator.

5. In a variable voltage drive, the combination of, a motor, a main generator for supplying electrical energy to the motor, an auxiliary generator for effecting a control of the motor current, means for exciting said auxiliary generator in accordance with the motor current, means for producing a standard excitation in opposition to the excitation according to the motor current, and means operable when the excitation according to the motor current is the predominating excitation for connecting the auxiliary generator to the main generator.

6. In a variable voltage drive, the combination of, a motor, a main generator for supplying electrical energy to the motor, an auxiliary generator for effecting a control of the motor current, means for exciting said auxiliary generator in accordance with the motor current, means for producing a standard excitation in opposition to the excitation according to the motor current, and means operable when the excitation according to the motor current is the predominating excitation for selectively connecting the auxiliary generator to the main generator, to both the main generator and the motor and only to said motor.

GEORGE E. KING.